(12) United States Patent
Kadoyama

(10) Patent No.: US 11,081,905 B2
(45) Date of Patent: *Aug. 3, 2021

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventor: Takahide Kadoyama, Saitama (JP)

(73) Assignee: SONY CORPORATION, Tokyo (JP)

(*) Notice: Subject to any disclaimer, the term of this patent is extended or adjusted under 35 U.S.C. 154(b) by 772 days.

This patent is subject to a terminal disclaimer.

(21) Appl. No.: 15/384,953

(22) Filed: Dec. 20, 2016

(65) Prior Publication Data

US 2017/0104372 A1 Apr. 13, 2017

Related U.S. Application Data

(63) Continuation of application No. 14/723,116, filed on May 27, 2015, now Pat. No. 9,564,758, which is a (Continued)

(30) Foreign Application Priority Data

Jan. 26, 2010 (JP) .............................. JP2010-014028

(51) Int. Cl.
*H01F 27/42* (2006.01)
*H01F 37/00* (2006.01)
(Continued)

(52) U.S. Cl.
CPC ............ *H02J 50/12* (2016.02); *H02J 7/0027* (2013.01); *H02J 50/80* (2016.02); *H04B 5/0037* (2013.01)

(58) Field of Classification Search
CPC .......... H02J 50/12; H02J 50/80; H02J 7/0027; H02J 7/025; H02J 7/00; H02J 50/10; H04B 5/0037; H04B 1/0053
(Continued)

(56) References Cited

U.S. PATENT DOCUMENTS

| 5,594,318 A | 1/1997 | Nor et al. |
| 8,178,995 B2 | 5/2012 | Amano et al. |

(Continued)

FOREIGN PATENT DOCUMENTS

| CN | 1849756 A | 10/2006 |
| CN | 101233666 A | 7/2008 |

(Continued)

OTHER PUBLICATIONS

Office Action for CN Patent Application No. 201510976342.1, dated Oct. 25, 2017, 08 pages of Office Action and 11 pages of English Translation.

(Continued)

*Primary Examiner* — Rexford N Barnie
*Assistant Examiner* — Toan T Vu
(74) *Attorney, Agent, or Firm* — Chip Law Group

(57) ABSTRACT

A power charging system is provided. The power charging system may have an information processing apparatus having a first communication unit and a power receiving unit, and an external apparatus having a second communication unit and a power transmission unit. The second communication unit may be configured to wirelessly communicate with the first communication unit using a first carrier wave having a first frequency and the power transmission unit may be configured to wirelessly transmit power to the power receiving unit using a second carrier wave having a second frequency, the second frequency being different from the first frequency.

8 Claims, 14 Drawing Sheets

Related U.S. Application Data continuation of application No. 12/930,853, filed on Jan. 19, 2011, now Pat. No. 9,071,075.

(51) Int. Cl.
  *H01F 38/00* (2006.01)
  *H02J 50/12* (2016.01)
  *H02J 7/00* (2006.01)
  *H02J 50/80* (2016.01)
  *H04B 5/00* (2006.01)

(58) Field of Classification Search
  USPC .......... 307/104; 320/108, 109; 455/39, 41.1, 455/41.2, 73, 77, 552.1
  See application file for complete search history.

(56) References Cited

U.S. PATENT DOCUMENTS

| | | |
|---|---|---|
| 2007/0010295 A1 | 1/2007 | Greene et al. |
| 2008/0012525 A1 | 1/2008 | Lin et al. |
| 2009/0001930 A1 | 1/2009 | Pohjonen |
| 2009/0079271 A1 | 3/2009 | Jin |
| 2009/0146892 A1* | 6/2009 | Shimizu ............ G06K 19/0723 343/745 |
| 2009/0156892 A1* | 6/2009 | Lau ................... A61N 1/368 600/37 |
| 2009/0284082 A1* | 11/2009 | Mohammadian ....... H02J 5/005 307/104 |
| 2010/0225272 A1 | 9/2010 | Kirby et al. |
| 2011/0080051 A1 | 4/2011 | Lee et al. |
| 2011/0081857 A1* | 4/2011 | Lee ................... H02J 7/025 455/41.1 |

FOREIGN PATENT DOCUMENTS

| | | |
|---|---|---|
| CN | 101399464 A | 4/2009 |
| CN | 101689698 A | 3/2010 |
| EP | 2162948 A1 | 3/2010 |
| JP | 07-282210 A | 10/1995 |
| JP | 09-135189 A | 5/1997 |
| JP | 2000-332664 A | 11/2000 |
| JP | 2001-076111 A | 3/2001 |
| JP | 2008-061208 A | 3/2008 |
| WO | 2006/058309 A2 | 6/2006 |
| WO | 2008/058562 A1 | 5/2008 |
| WO | 2009/003707 A1 | 1/2009 |
| WO | 2006/058309 A3 | 4/2009 |

OTHER PUBLICATIONS

Office Action for CN Patent Application No. 201510976342.1, dated Aug. 3, 2018, 09 pages of Office Action and 13 pages of English Translation.
Extended European Search Report for EP Patent Application No. 11151154.9, dated Jul. 19, 2016, 12 pages.
Partial European Search Report received for European Patent Application No. 11151154.9, dated Apr. 1, 2016, 7 pages.
Office Action for EP Patent Application No. 11151154.9, dated Mar. 4, 2019, 05 pages of Office Action.
Office Action for CN Patent Application No. 201510976342.1, dated Aug. 15, 2019, 08 pages of Office Action and 11 pages of English Translation.
Extended European Search Report of EP Application No. 201879343, dated Jan. 15, 2021, 08 pages.

* cited by examiner

INFORMATION PROCESSING APPARATUS, INFORMATION PROCESSING METHOD, AND INFORMATION PROCESSING SYSTEM

CROSS-REFERENCE TO RELATED APPLICATION

The present application is a continuation application of U.S. patent application Ser. No. 14/723,116, filed May 27, 2015, which is a continuation application of U.S. patent application Ser. No. 12/930,853, filed Jan. 19, 2011 and claims the priority from prior Japanese Priority Patent Application JP 2010-014028 filed Jan. 26, 2010, the entire contents of which are incorporated herein by reference.

FIELD OF THE INVENTION

The present invention relates to an information processing apparatus, an information processing method, and an information processing system.

DESCRIPTION OF THE RELATED ART

In recent years, information processing apparatuses, such as IC cards and mobile telephones, equipped with a non-contact communication function have come into widespread use. As one example, by simply passing an information processing apparatus equipped with a non-contact communication function over a reader/writer installed in an automatic ticket gate at an underground railway station, a user can pass through the gate, which is extremely convenient.

The information processing apparatus equipped with the non-contact communication function and a reader/writer, for example, use a carrier wave with a specific frequency such as 13.56 MHz. Communication is carried out between the reader/writer and the information processing apparatus by having the reader/writer transmit a carrier wave on which a carrier wave signal has been superimposed and having the information processing apparatus that has received the carrier wave via an antenna send back a response signal in reply to the received carrier wave signal using load modulation.

Also, in the field of information processing apparatuses equipped with a non-contact communication function, techniques for non-contact charging of batteries and the like are also being proposed. As one example, a non-contact power transfer system that specifies the rated power of the power-receiving apparatus and constantly transmits power so that the maximum transfer power of the power-transmitting apparatus matches the rated power of the power-receiving apparatus has been proposed (see Japanese Laid-Open Patent Publication No. 2008-206233, for example).

SUMMARY OF THE INVENTION

In one aspect of the invention, an information processing apparatus comprising a communication unit to wirelessly communicate with an external apparatus using a first carrier wave having a first frequency is provided. A power receiving unit may wirelessly receive power from the external apparatus using a second carrier wave of a second frequency, the second frequency being different from the first frequency.

In a further aspect of the invention, a method for use in a first apparatus which is operable with an external apparatus is provided. The method may comprise detecting a power transmit request signal from the external apparatus; transmitting to the external apparatus a response signal to permit a start of power transmission in response to the detected power transmit request signal; receiving from the external apparatus a frequency change request signal to request a change of a resonant frequency of a resonance circuit in the first apparatus from a first frequency to a second frequency, in which a communication carrier wave having the first frequency is utilized for communication with the external apparatus; changing the resonant frequency of the resonance circuit from the first frequency to the second frequency in response to the frequency change request signal from the external apparatus; and, receiving power by way of a power transmission carrier wave having the second frequency.

In another aspect of the invention, a power charging system is provided. The power charging system may include an information processing apparatus having a first communication unit and a power receiving unit, and an external apparatus having a second communication unit and a power transmission unit. The second communication unit may be configured to wirelessly communicate with the first communication unit using a first carrier wave having a first frequency and the power transmission unit may be configured to wirelessly transmit power to the power receiving unit using a second carrier wave having a second frequency, the second frequency being different from the first frequency.

In yet a further aspect of the invention, a computer-readable medium having stored thereon computer-executable instructions for causing a first apparatus to perform an operation method is provided. The method may comprise detecting a power transmit request signal from an external apparatus; transmitting to the external apparatus a response signal to permit a start of power transmission in response to the detected power transmit request signal; receiving from the external apparatus a frequency change request signal to request a change of a resonant frequency of a resonance circuit in the first apparatus from a first frequency to a second frequency, in which a communication carrier wave having the first frequency is utilized for communication with the external apparatus; changing the resonant frequency of the resonance circuit from the first frequency to the second frequency in response to the frequency change request signal from the external apparatus; and, receiving power by way of a power transmission carrier wave having the second frequency.

When a non-contact charging function is provided in an information processing apparatus equipped with a non-contact communication function, to miniaturize the apparatus, it is preferable to use the antenna used for non-contact communication additionally for the non-contact charging.

However, if a carrier wave with a frequency of 13.56 MHz that is used for non-contact communication is used during non-contact charging, the high output during non-contact charging means that the induced voltage will be extremely high, resulting in the risk that the electrical circuit provided for non-contact communication in the information processing apparatus will be destroyed.

Also, even if a carrier wave of a frequency other than 13.56 MHz that is used for non-contact communication is used during non-contact charging, an induced voltage will still be produced, resulting in an induced voltage and current being applied to the electrical circuit provided for non-contact communication in the information processing apparatus. If this state continues for a long period, there is the risk that such electrical circuit will be destroyed.

In light of the foregoing, it is desirable to provide a novel and improved information processing apparatus, information processing method, and information processing system where it is possible for an information processing apparatus equipped with non-contact communication and charging functions to carry out non-contact charging safely.

DETAILED DESCRIPTION

Figure 1:
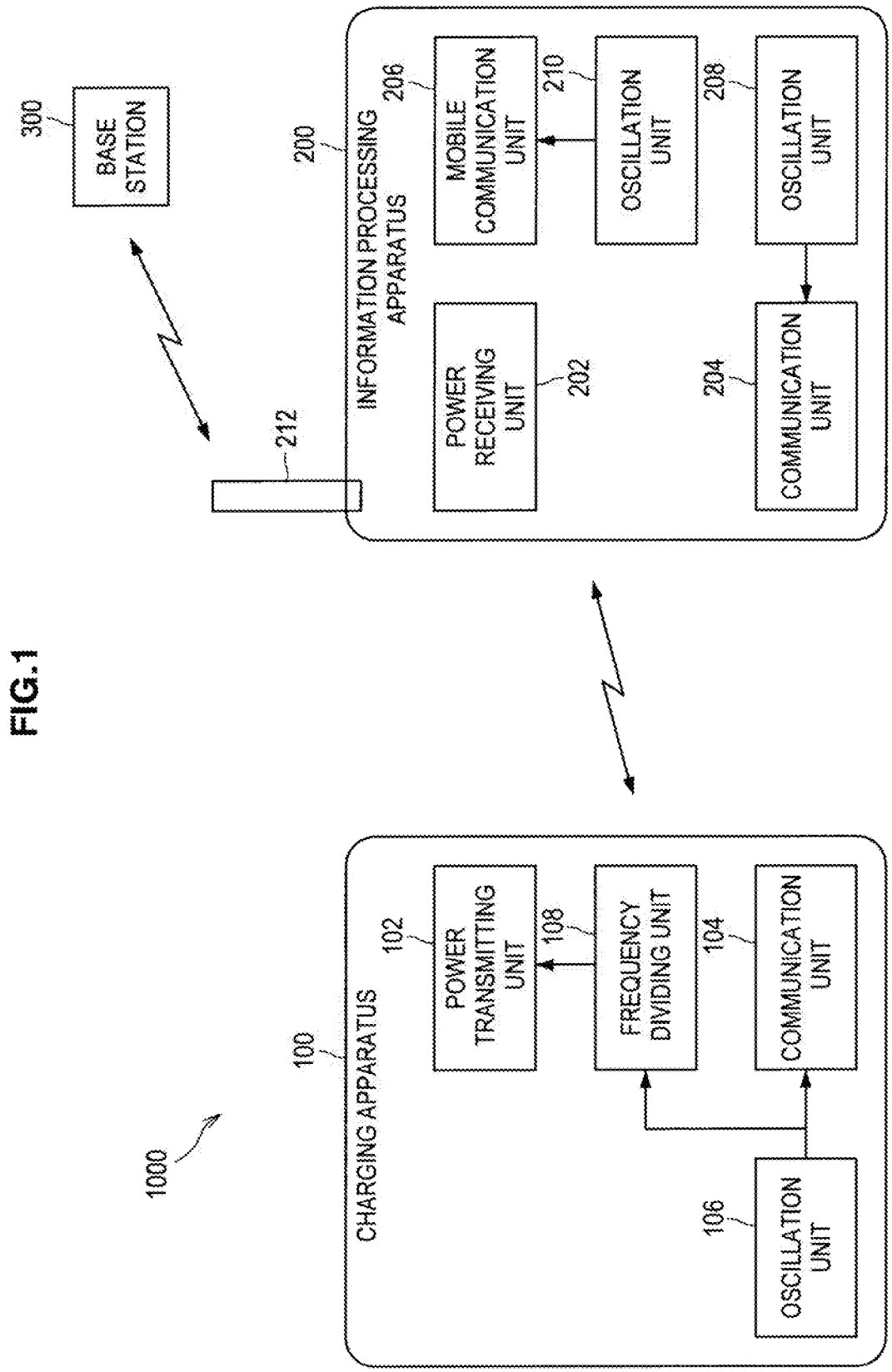
FIG. 1 is a diagram mainly showing the overall configuration of an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.
Embodiments of the present invention are described in the order indicated below.

1. Information Processing System (First Embodiment)
2. First Charging/Communication Process
3. Second Charging/Communication Process
4. Third Charging/Communication Process
5. Information Processing System (Second Embodiment)
6. Information Processing System (Third Embodiment)
7. Charging/Communication Process
8. Information Processing System (Fourth Embodiment)
9. Results of Numerical Simulation 1. Information Processing System (First Embodiment)

First, an information processing system according to a first embodiment of the present invention will be described. FIG. 1 is a diagram mainly showing the overall configuration of an information processing system according to the present embodiment.

In FIG. 1, an information processing system 1000 includes a charging apparatus 100 equipped with a reader/writer function and an information processing apparatus 200, such as a mobile telephone, equipped with a non-contact communication function. Note that the charging apparatus 100 is one example of a "first information processing apparatus" for the present invention and the information processing apparatus 200 is one example of a "second information processing apparatus" for the present invention.

The charging apparatus 100 includes a power transmitting unit 102, a communication unit 104, an oscillation unit 106, and a frequency dividing unit 108. The power transmitting unit 102 transmits power to the information processing apparatus 200 using a coil L0 provided in the charging apparatus 100 and shown in FIG. 2, described later. The communication unit 104 communicates with the information processing apparatus 200 using the coil L0 shown in FIG. 2. The oscillation unit 106 generates alternating current with a frequency of 27.12 MHz, for example. The frequency dividing unit 108 divides the alternating current generated by the oscillation unit 106.

The communication unit 104 uses alternating current with a frequency of 13.56 MHz produced by frequency division of the alternating current with the 27.12 MHz frequency generated by the oscillation unit 106 during communication as a carrier wave. Note that the 13.56 MHz frequency is one example of a "first frequency" for the present invention. During power transmission, the power transmitting unit 102 uses alternating current of a frequency of 6.78 MHz, for example, produced by the frequency dividing unit 108 further dividing alternating current of the 13.56 MHz frequency produced by dividing the alternating current of the 27.12 MHz frequency generated by the oscillation unit 106. Note that the 6.78 MHz frequency is one example of a "second frequency" for the present invention, which is a sub-harmonic of the first frequency.

The information processing apparatus 200 includes a power receiving unit 202, a communication unit 204, a mobile communication unit 206, oscillation units 208, 210, and an antenna 212. The power receiving unit 202 receives the power transmitted from the charging apparatus 100 using a coil L1 provided in the information processing apparatus 200 and shown in FIG. 2, described later. The communication unit 204 communicates with the charging apparatus 100 using the coil L1 shown in FIG. 2. The mobile communication unit 206 communicates with a base station 300 connected to a mobile telephone network (not shown) using the antenna 212. The oscillation unit 208 generates alternating current with the 27.12 MHz frequency, for example. The oscillation unit 210 generates alternating current with a frequency of 19.2 MHz, for example.

The communication unit 204 uses alternating current with a frequency of 13.56 MHz produced by frequency division of the alternating current with the 27.12 MHz frequency generated by the oscillation unit 208 during communication as a carrier wave. The mobile communication unit 206 uses the alternating current with the 19.2 MHz frequency generated by the oscillation unit 210 during communication as a carrier wave.

In the information processing system 1000, the charging apparatus 100 and the information processing apparatus 200 are capable of non-contact communication and non-contact charging.

Figure 2:
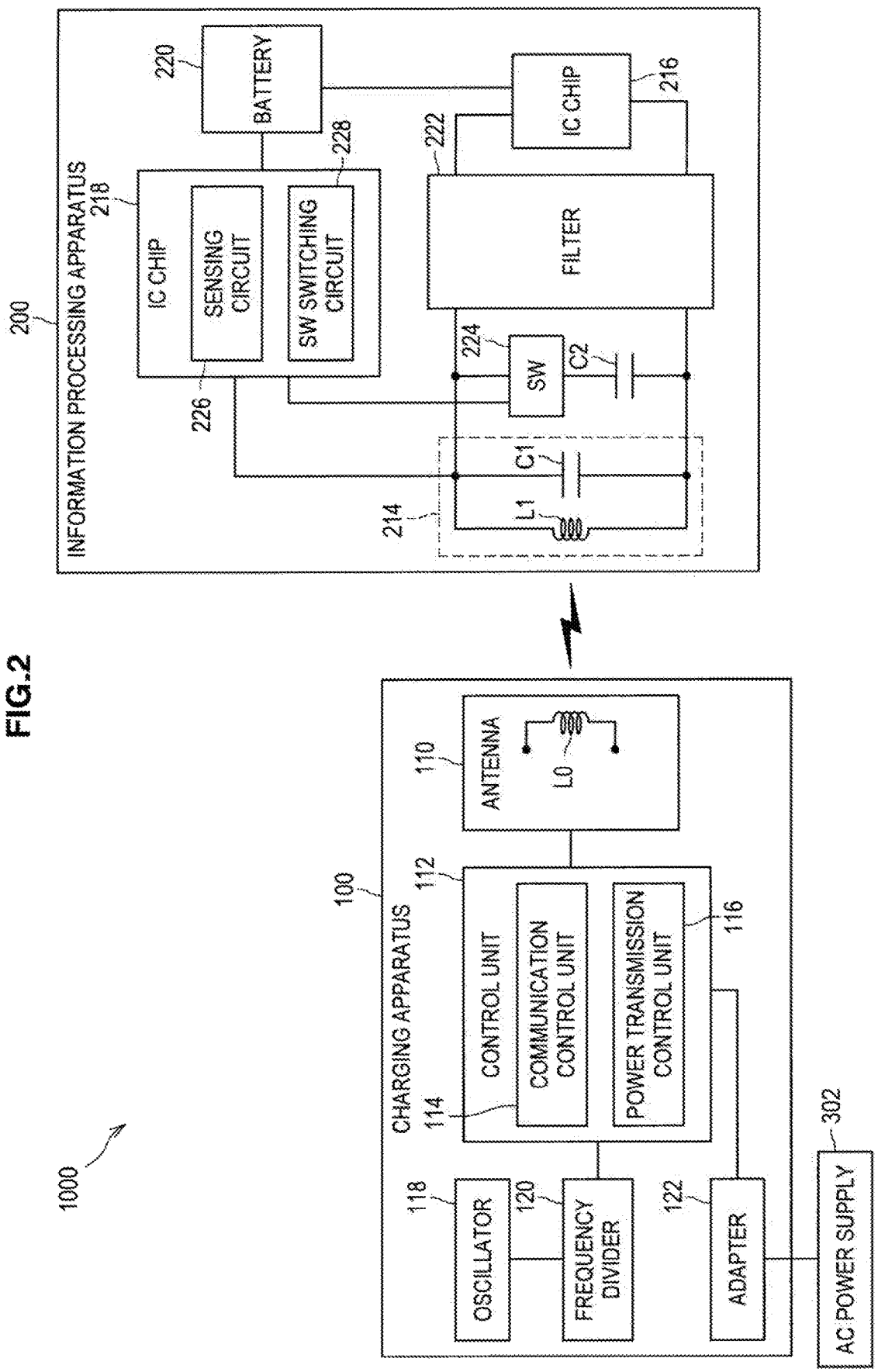
FIG. 2 is a diagram useful in showing the overall configuration of the information processing system shown in FIG. 1 in more detail.

Next, the configuration of the information processing system 1000 shown in FIG. 1 will be described in more detail. FIG. 2 is a diagram useful in showing the overall configuration of the information processing system 1000 shown in FIG. 1 in more detail.

In FIG. 2, the charging apparatus 100 includes an antenna 110, a control unit 112, an oscillator 118, a frequency divider 120, and an adapter 122. The antenna 110 includes the coil L0. The control unit 112 controls the various components of the charging apparatus 100. The control unit 112 also includes a communication control unit 114 and a power transmission control unit 116. The oscillator 118 is an oscillator, such as a crystal oscillator, that generates alternating current with the 27.12 MHz frequency, for example. The frequency divider 120 divides the alternating current with the 27.12 MHz frequency generated by the oscillator 118 to generate alternating current with the 13.56 MHz frequency and alternating current with the 6.78 MHz frequency. The adapter 122 is connected to an AC power supply 302 and supplies power to the various components of the charging apparatus 100.

The information processing apparatus 200 includes a resonance circuit 214 in which the coil L1 and a capacitor C1 are connected in parallel, integrated circuit ("IC") chips 216, 218, a battery 220, a filter 222, and a switch (SW) 224 for activate or deactivate a capacitor C2. Note that the SW 224 is one example of a "setting unit" for the present invention. In the resonance circuit 214, the 13.56 MHz frequency is set as the resonant frequency. The IC chip 216 is an electrical circuit for non-contact communication. The IC chip 218 is an electrical circuit for charging the battery 220. The battery 220 stores the power transmitted from the charging apparatus 100. The battery 220 also supplies the stored power to various components of the information processing apparatus 200. The filter 222 is set with a specific cutoff frequency. For example, if alternating current with the 6.78 MHz frequency is used when the charging apparatus 100 transmits power, a cutoff frequency of 6.78 MHz is set in the filter 222.

The IC chip 218 includes a sensing circuit 226 and a SW switching circuit 228. The sensing circuit 226 detects signals of a specific frequency. For example, if alternating current with the 6.78 MHz frequency is used when the charging apparatus 100 transmits power, the sensing circuit 226 detects alternating current with the 6.78 MHz frequency. The SW switching circuit 228 is one example of a "setting unit" for the present invention and controls on/off switching of the SW 224. When the SW 224 is switched on, the capacitor C2 is connected and the resonant frequency of the resonance circuit 214 is set at a specific frequency. For example, if alternating current with the 6.78 MHz frequency is used during power transmission by the charging apparatus 100, the resonant frequency of the resonance circuit 214 is set at the 6.78 MHz frequency when the capacitor C2 is connected. Note that although the IC chip 216 and the IC chip 218 are separate IC chips in the present embodiment, the IC chip 216 and the IC chip 218 may be realized by the same IC chip.

2. First Charging/Communication Process

Figure 3:
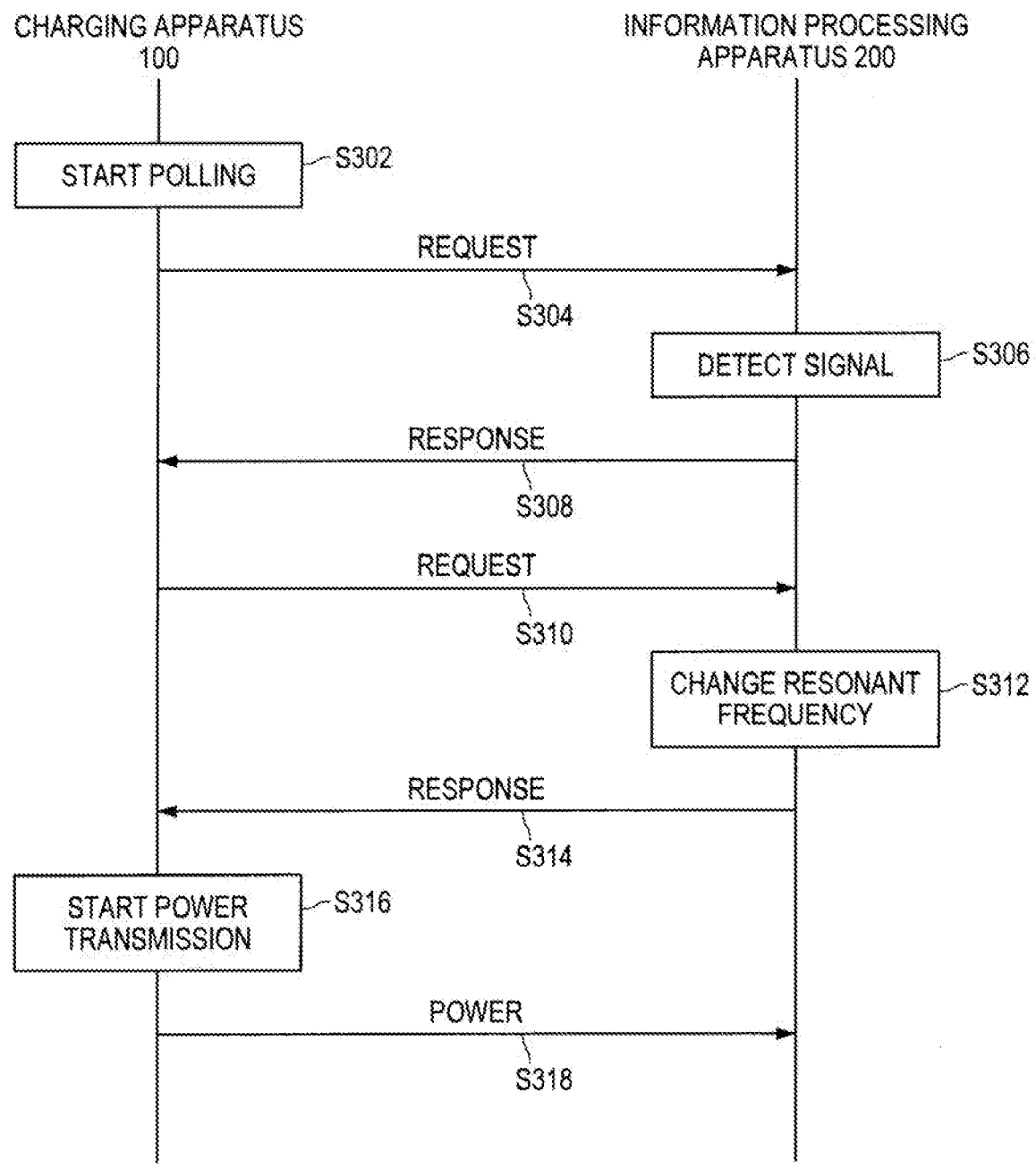
FIG. 3 is a sequence diagram of a first charging/communication process carried out by the information processing system shown in FIG. 1.

Next, a first charging/communication process carried out by the information processing system 1000 shown in FIG. 1 will be described. FIG. 3 is a sequence diagram of the first charging/communication process carried out by the information processing system 1000 shown in FIG. 1.

In FIG. 3, first, the power transmission control unit 116 of the charging apparatus 100 starts polling, that is, the power transmission control unit 116 starts searching for the information processing apparatus 200 by transmitting a request signal for a start of power transmission with the 6.78 MHz frequency, for example, to the external at specific intervals (step S302). The power transmission control unit 116 of the charging apparatus 100 thereafter transmits a request signal with the 6.78 MHz frequency to the information processing apparatus 200 (step S304).

Next, the sensing circuit 226 of the information processing apparatus 200 detects the request signal for a start of power transmission with the 6.78 MHz frequency transmitted in step S304 (step S306).

After this, the IC chip 218 of the information processing apparatus 200 transmits a response signal for permitting the start of power transmission to the charging apparatus 100 as a reply to the request signal transmitted in step S304 (step S308).

Next, the power transmission control unit 116 of the charging apparatus 100 transmits a request signal with the 6.78 MHz frequency for changing the resonant frequency of the resonance circuit 214 of the information processing apparatus 200 to the information processing apparatus 200 (step S310).

After this, based on the request signal transmitted in step S310, the SW switching circuit 228 of the information processing apparatus 200 switches the SW 224 on to change the resonant frequency of the resonance circuit 214 from the 13.56 MHz frequency to the 6.78 MHz frequency (step S312).

Next, the IC chip 218 of the information processing apparatus 200 transmits a response signal to the charging apparatus 100 as a reply to the request signal transmitted in step S310 (step S314).

After this, the power transmission control unit 116 of the charging apparatus 100 starts transmitting power to the information processing apparatus 200 using alternating current with the 6.78 MHz frequency (step S316). The power transmission control unit 116 of the charging apparatus 100 thereafter transmits power to the information processing apparatus 200 (step S318) and the present process ends.

According to the first charging/communication process shown in FIG. 3, the power transmission control unit 116 of the charging apparatus 100 transmits a request signal for a start of power transmission, a request signal for changing the resonant frequency, and also power to the information processing apparatus 200 using the 6.78 MHz frequency. Here, since the information processing apparatus 200 is equipped with the filter 222 whose cutoff frequency is set at 6.78 MHz, alternating current with the 6.78 MHz frequency is blocked by the filter 222. By doing so, during non-contact charging, it is possible to suppress the load applied to the IC chip 216, or in other words, the electrical circuit for non-contact communication. If, for example, one execution of non-contact communication takes one minute at most and non-contact communication is carried out ten times a day, due to non-contact communication, a load will be applied to the electrical circuit for non-contact communication for ten minutes a day at most. Conversely, if, for example, the user mistakenly or intentionally leaves the information processing apparatus 200 over the charging apparatus 100 for half a day, a day, several days, or even several months, due to non-contact charging, a load will be applied to the electrical circuit used for non-contact communication for a long time. According to the present embodiment, since it is possible to suppress the load applied to the IC chip 216, or in other words, the electrical circuit used for non-contact communication during non-contact charging, it is possible to prevent the electrical circuit used for non-contact communication from being destroyed, even when the non-contact charging state continues for a long time. This means that non-contact charging can be carried out safely.

Note that although the information processing apparatus 200 is equipped with the filter 222 whose cutoff frequency is set at 6.78 MHz in the present embodiment, the filter provided in the information processing apparatus 200 may be any filter that passes only the frequency used for communication, for example a signal with the 13.56 MHz frequency or a baseband signal, in addition to harmonic components of the same.

Note that although power is transmitted by the charging apparatus 100 in the present embodiment, it is also possible for an information processing apparatus such as a mobile telephone equipped with a non-contact communication function to transmit the power.

Note that although alternating current of the 6.78 MHz frequency is used when the charging apparatus 100 transmits power in the present embodiment, it is preferable to use alternating current of a lower sub-harmonic frequency, such as a frequency of 3.39 MHz produced by a larger frequency division ratio. For example, according to radiation protection standards, it is normally possible to safely increase a low-frequency output compared to a high-frequency output. By doing so, since it is possible for the charging apparatus 100 to safely transmit power with a high output, the charging efficiency can be improved.

3. Second Charging/Communication Process

Figure 4:
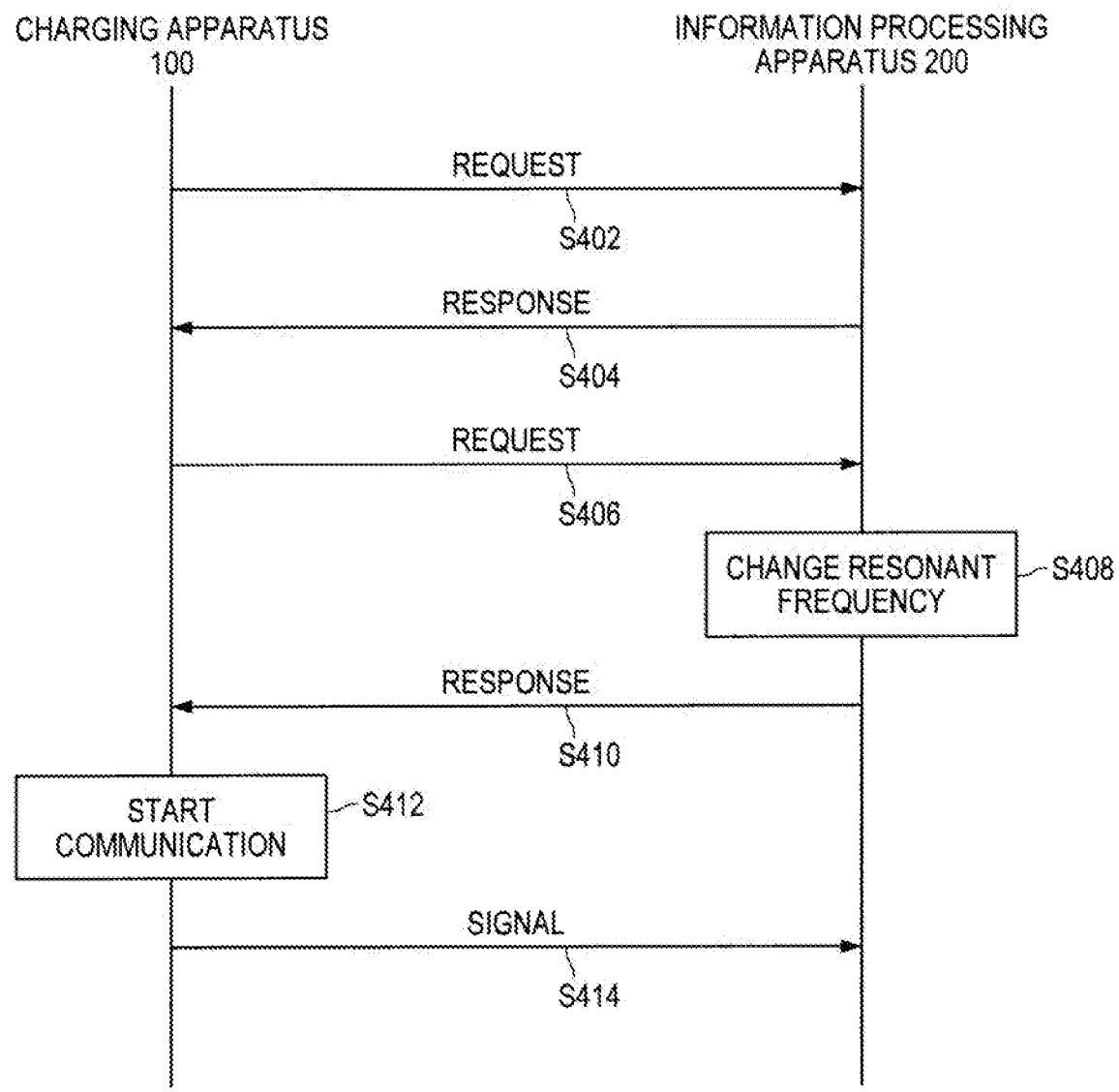
FIG. 4 is a sequence diagram of a second charging/communication process carried out by the information processing system shown in FIG. 1.

Next, a second charging/communication process carried out by the information processing system 1000 shown in FIG. 1 will be described. FIG. 4 is a sequence diagram of the second charging/communication process carried out by the information processing system 1000 shown in FIG. 1. The present process is carried out after the first charging/communication process shown in FIG. 3.

In FIG. 4, first, the communication control unit 114 of the charging apparatus 100 transmits a request signal for a start of non-contact communication to the information processing apparatus 200 (step S402).

Next, the IC chip 218 of the information processing apparatus 200 transmits a response signal for permitting a start of communication in reply to the request signal transmitted in step S402 to the charging apparatus 100 (step S404).

After this, the communication control unit 114 of the charging apparatus 100 transmits a request signal for changing the resonant frequency of the resonance circuit 214 of the information processing apparatus 200 to the information processing apparatus 200 (step S406).

Next, based on the request signal transmitted in step S406, the SW switching circuit 228 of the information processing apparatus 200 switches the SW 224 off to change the resonant frequency of the resonance circuit 214 from the 6.78 MHz frequency to the 13.56 MHz frequency (step S408).

After this, the IC chip 218 of the information processing apparatus 200 transmits a response signal as a reply to the request signal transmitted in step S406 to the charging apparatus 100 (step S410).

After this, the communication control unit 114 of the charging apparatus 100 starts non-contact communication with the information processing apparatus 200 using a carrier wave with the 13.56 MHz frequency (step S412). The communication control unit 114 of the charging apparatus 100 then transmits a signal to the information processing apparatus 200 (step S414) and the present process ends.

According to the second charging/communication process shown in FIG. 4, in the information processing system 1000, when non-contact communication is carried out after non-contact charging, the resonant frequency of the resonance circuit 214 of the information processing apparatus 200 is changed from the 6.78 MHz frequency that was changed to during non-contact charging to the 13.56 MHz frequency. Accordingly, it is possible to carry out non-contact communication reliably even after non-contact charging.

4. Third Charging/Communication Process

Figure 5:
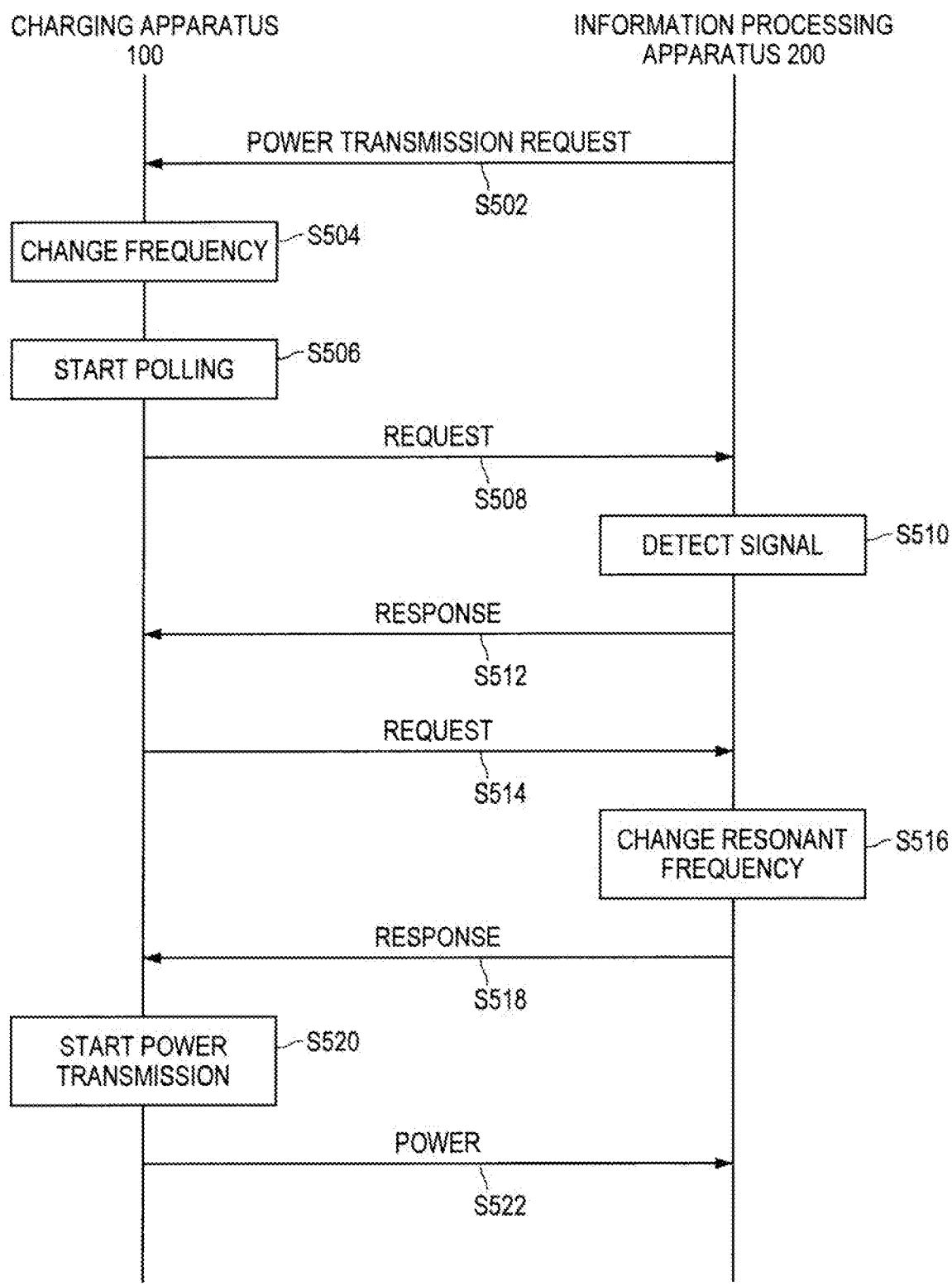
FIG. 5 is a sequence diagram of a third charging/communication process carried out by the information processing system shown in FIG. 1.

Next, a third charging/communication process carried out by the information processing system 1000 shown in FIG. 1 will be described. FIG. 5 is a sequence diagram of the third charging/communication process carried out by the information processing system 1000 shown in FIG. 1.

In FIG. 5, first, the IC chip 218 of the information processing apparatus 200 requests the charging apparatus 100 to transmit power (step S502).

Next, the power transmission control unit 116 of the charging apparatus 100 changes the frequency of the alternating current in use from the 13.56 MHz frequency used during communication to 6.78 Mhz, for example (step S504).

After this, the power transmission control unit 116 of the charging apparatus 100 starts polling, that is, the power transmission control unit 116 starts searching for the information processing apparatus 200 by transmitting a request signal for a start of power transmission with the 6.78 MHz frequency to the external at specific intervals (step S506). The power transmission control unit 116 of the charging apparatus 100 thereafter transmits a request signal with the 6.78 MHz frequency to the information processing apparatus 200 (step S508).

Next, the sensing circuit 226 of the information processing apparatus 200 detects the request signal for a start of power transmission with the 6.78 MHz frequency transmitted in step S508 (step S510).

After this, the IC chip 218 of the information processing apparatus 200 transmits a response signal for permitting the start of power transmission to the charging apparatus 100 in reply to the request signal transmitted in step S508 (step S512).

Next, the power transmission control unit 116 of the charging apparatus 100 transmits a request signal with the 6.78 MHz frequency for changing the resonant frequency of the resonance circuit 214 of the information processing apparatus 200 to the information processing apparatus 200 (step S514).

After this, based on the request signal transmitted in step S514, the SW switching circuit 228 of the information processing apparatus 200 switches the SW 224 on to change the resonant frequency of the resonance circuit 214 from the 13.56 MHz frequency to the 6.78 MHz frequency (step S516).

Next, the IC chip 218 of the information processing apparatus 200 transmits a response signal as a reply to the request signal transmitted in step S514 to the charging apparatus 100 (step S518).

After this, the power transmission control unit 116 of the charging apparatus 100 starts transmitting power to the information processing apparatus 200 using alternating current with the 6.78 MHz frequency (step S520). The power transmission control unit 116 of the charging apparatus 100 thereafter transmits power to the information processing apparatus 200 (step S522) and the present process ends.

According to the third charging/communication process shown in FIG. 5, after receiving the power transmission request from the information processing apparatus 200, the power transmission control unit 116 of the charging apparatus 100 changes the frequency of the alternating current in use from 13.56 MHz that is used during communication to 6.78 MHz. The power transmission control unit 116 then transmits a request signal for a start of power transmission and a request signal for changing the resonant frequency, in addition to power to the information processing apparatus 200 using the 6.78 MHz frequency. Here, since the information processing apparatus 200 is equipped with the filter 222 whose cutoff frequency is set at 6.78 MHz, alternating current with the 6.78 MHz frequency is blocked by the filter 222. By doing so, since it is possible to suppress the load applied to the IC chip 216, or in other words, the electrical circuit for non-contact communication during non-contact charging, it is possible to prevent the electrical circuit used for non-contact communication from being destroyed, even when the non-contact charging state continues for a long time. This means that non-contact charging can be carried out safely.

5. Information Processing System (Second Embodiment)

Figure 6:
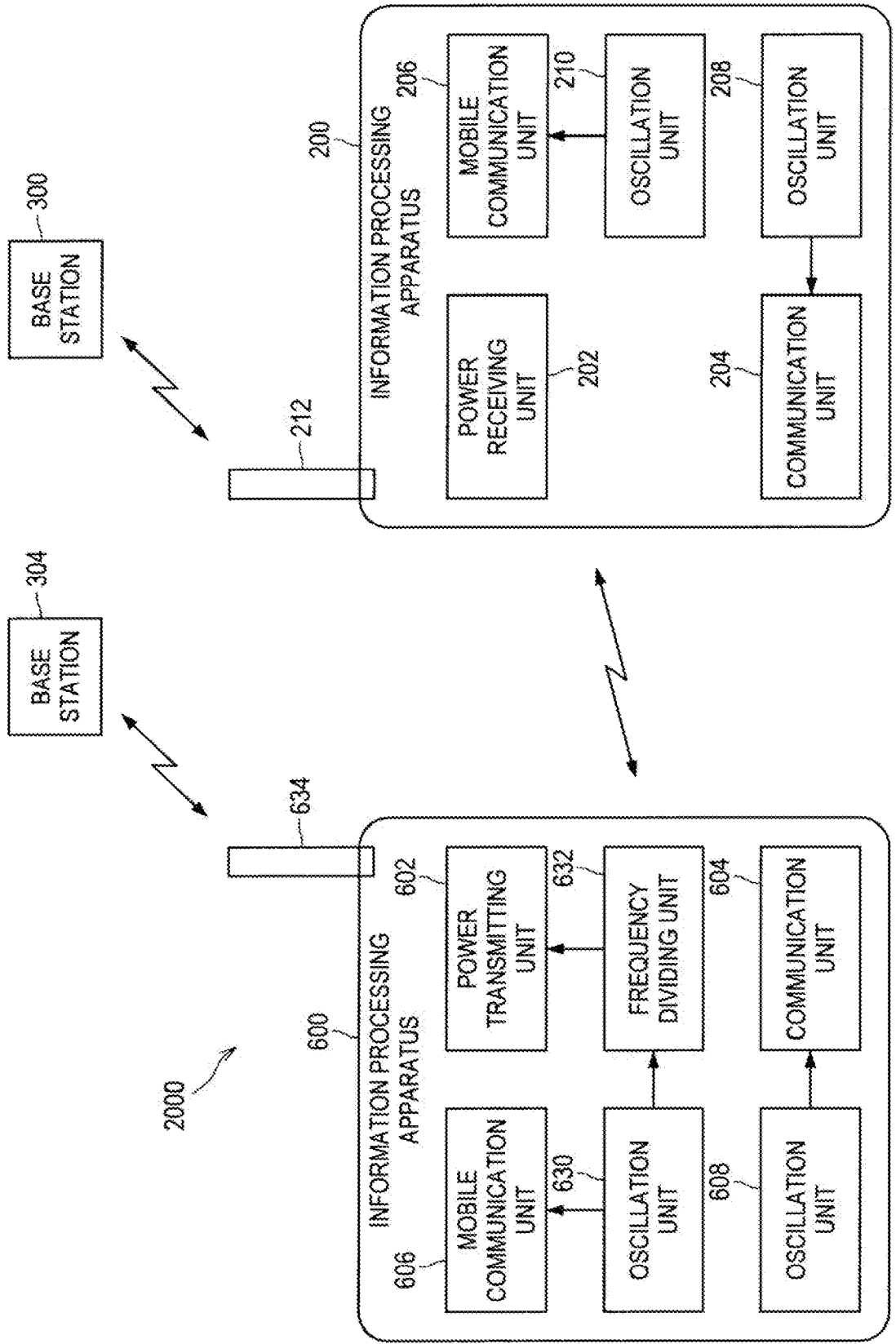
FIG. 6 is a diagram mainly showing the overall configuration of an information processing system according to a second embodiment of the present invention.

Next, an information processing system according to a second embodiment of the present invention will be described. FIG. 6 is a diagram mainly showing the overall configuration of an information processing system according to the present embodiment. The information processing system according to the present embodiment differs to the first embodiment described above by including an information processing apparatus, such as a mobile telephone, equipped with a non-contact communication function in place of the charging apparatus 100, by having such information processing apparatus transmit power, and also by transmitting power using alternating current generated by an oscillation unit of a mobile communication unit.

In FIG. 6, an information processing system 2000 includes information processing apparatuses 600, 200, such as mobile telephones, equipped with a non-contact communication function. Note that the information processing apparatus 600 is one example of a "first information processing apparatus" for the present invention and the information processing apparatus 200 is one example of a "second information processing apparatus" for the present invention.

The information processing apparatus 600 includes a power transmitting unit 602, a communication unit 604, a mobile communication unit 606, oscillation units 608, 630, and a frequency dividing unit 632. The power transmitting unit 602 transmits power to the information processing apparatus 200 using a coil L0 provided in the information processing apparatus 600 and shown in FIG. 7, described later. The communication unit 604 communicates with the information processing apparatus 200 using the coil L0 shown in FIG. 7. The mobile communication unit 606 communicates with a base station 304 connected to a mobile telephone network (not shown) using an antenna 634. The oscillation unit 608 generates alternating current with a frequency of 27.12 MHz, for example. The oscillation unit 630 generates alternating current with a frequency of 19.2 MHz, for example. Note that the 19.2 MHz frequency is one example of a "third frequency" for the present invention. The frequency dividing unit 632 divides the alternating current generated by the oscillation unit 630.

The communication unit 604 uses alternating current with a frequency of 13.56 MHz produced by frequency division of the alternating current with the 27.12 MHz frequency generated by the oscillation unit 608 during communication as a carrier wave. The power transmitting unit 602 uses alternating current with a frequency of 4.8 MHz, for example, produced by the frequency dividing unit 632 dividing the alternating current with the 19.2 MHz frequency generated by the oscillation unit 630 during power transmission. The mobile communication unit 606 uses the alternating current with the 19.2 MHz frequency generated by the oscillation unit 630 during communication as a carrier wave.

The information processing apparatus 200 includes the power receiving unit 202, the communication unit 204, the mobile communication unit 206, the oscillation units 208, 210, and the antenna 212. The power receiving unit 202 receives the power transmitted from the information processing apparatus 600 using a coil L1 provided in the information processing apparatus 200 and shown in FIG. 7, described later. The communication unit 204 communicates with the information processing apparatus 600 using the coil L1 shown in FIG. 7. The mobile communication unit 206 communicates with the base station 300 connected to a mobile telephone network (not shown) using the antenna 212. The oscillation unit 208 generates alternating current with the 27.12 MHz frequency, for example. The oscillation unit 210 generates alternating current with the 19.2 MHz frequency, for example.

The communication unit 204 uses alternating current with a frequency of 13.56 MHz produced by dividing the alternating current with the 27.12 MHz frequency generated by the oscillation unit 208 during communication as a carrier wave. The mobile communication unit 206 uses the alternating current with the 19.2 MHz frequency generated by the oscillation unit 210 during communication as a carrier wave.

In the information processing system 2000, the information processing apparatus 600 and the information processing apparatus 200 are capable of non-contact communication and non-contact charging.

Figure 7:
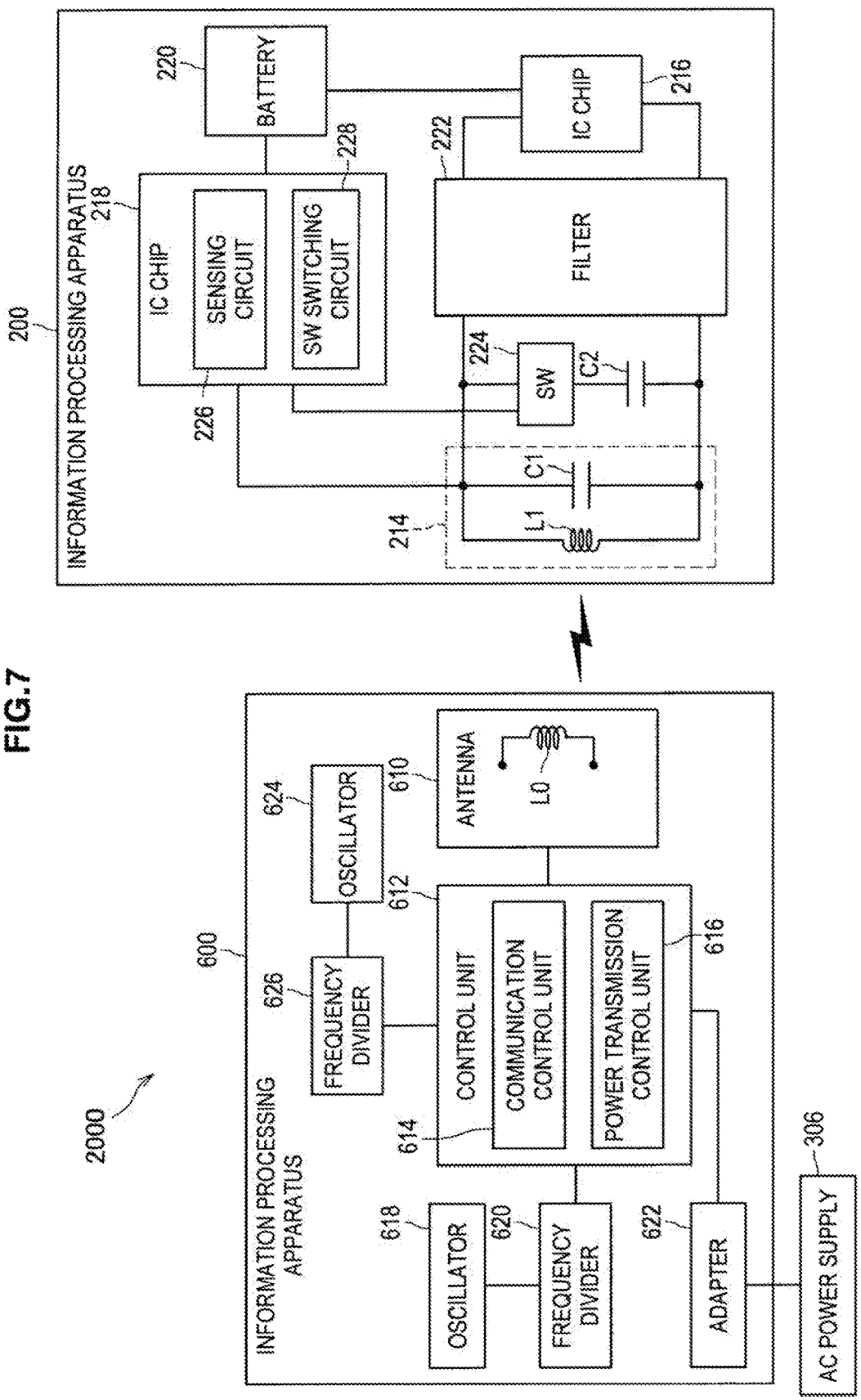
FIG. 7 is a diagram useful in showing the overall configuration of the information processing system shown in FIG. 6 in more detail.

Next, the configuration of the information processing system 2000 shown in FIG. 6 will be described in more detail. FIG. 7 is a diagram useful in showing the overall configuration of the information processing system 2000 shown in FIG. 6 in more detail.

In FIG. 7, the information processing apparatus 600 includes an antenna 610, a control unit 612, oscillators 618, 624, frequency dividers 620, 626, and an adapter 622. The antenna 610 includes the coil L0. The control unit 612 controls the various components of the information processing apparatus 600. The control unit 612 also includes a communication control unit 614 and a power transmission control unit 616. The oscillator 618 is an oscillator, such as a crystal oscillator, that generates alternating current with the 27.12 MHz frequency, for example. The frequency divider 620 divides the alternating current with the 27.12 MHz frequency generated by the oscillator 618 to generate alternating current with the 13.56 MHz frequency. The oscillator 624 is an oscillator, such as a crystal oscillator, that generates alternating current with the 19.2 MHz frequency, for example. The frequency divider 626 divides the alternating current with the 19.2 MHz frequency generated by the oscillator 624 to generate alternating current with a frequency of 4.8 MHz, for example. Note that the frequency divider 626 may be a programmable frequency divider that is capable of dividing alternating current of various frequencies to produce various other frequencies. The adapter 622 is connected to an AC power supply 306 and supplies power to the various components of the information processing apparatus 600.

The information processing apparatus 200 includes the resonance circuit 214 in which the coil L1 and the capacitor C1 are connected in parallel, the IC chips 216, 218, the battery 220, the filter 222, and the switch (SW) 224 for activate or deactivate the capacitor C2. In the resonance circuit 214, the 13.56 MHz frequency is set as the resonant frequency. The IC chip 216 is an electrical circuit for non-contact communication. The IC chip 218 is an electrical circuit for charging the battery 220. The battery 220 stores the power transmitted from the information processing apparatus 600. The battery 220 also supplies the stored power to the various components of the information processing apparatus 200. The filter 222 is set with a specific cutoff frequency. For example, if alternating current with the 4.8 MHz frequency, which is a sub-harmonic of the illustrative third frequency 19.2 MHz, is used when the information processing apparatus 600 transmits power, a cutoff frequency of 4.8 MHz is set in the filter 222.

The IC chip 218 includes the sensing circuit 226 and the SW switching circuit 228. The sensing circuit 226 detects signals of a specific frequency. For example, if alternating current with the 4.8 MHz frequency is used when the information processing apparatus 600 transmits power, the sensing circuit 226 detects signals with the 4.8 MHz frequency. The SW switching circuit 228 controls on/off switching of the SW 224. When the SW 224 is switched on, the capacitor C2 is connected and the resonant frequency of the resonance circuit 214 is set at a specific frequency. For example, if alternating current with the 4.8 MHz frequency is used during power transmission by the information processing apparatus 600, the resonant frequency of the resonance circuit 214 is set at the 4.8 MHz frequency when the capacitor C2 is connected.

According to the present embodiment, the power transmission control unit 616 of the information processing apparatus 600 transmits a request signal for a start of power transmission, a request signal for changing the resonant frequency, and also power to the information processing apparatus 200 using the 4.8 MHz frequency. Here, since the information processing apparatus 200 includes the filter 222 whose cutoff frequency is set at 4.8 MHz, alternating current with the 4.8 MHz frequency is blocked by the filter 222. By doing so, since it is possible to suppress the load applied to the IC chip 216, or in other words, the electrical circuit for non-contact communication during non-contact charging, it is possible to prevent the electrical circuit used for non-contact communication from being destroyed, even when the non-contact charging state continues for a long time. This means that non-contact charging can be carried out safely.

In addition, according to the present embodiment, if the power transmission control unit 616 of the information processing apparatus 600 uses alternating current of the 4.8 MHz frequency produced by frequency division of the alternating current generated from the oscillator 624 that differs to the oscillator 618 that generates the carrier wave with the 13.56 MHz frequency, it becomes difficult for harmonic components to be produced at or near the resonant frequency of 13.56 MHz that is set in the resonance circuit 214 during non-contact communication. By doing so, it is possible to further suppress the load applied to the IC chip 216, or in other words, the electrical circuit for non-contact communication during non-contact charging.

6. Information Processing System (Third Embodiment)

Figure 8:
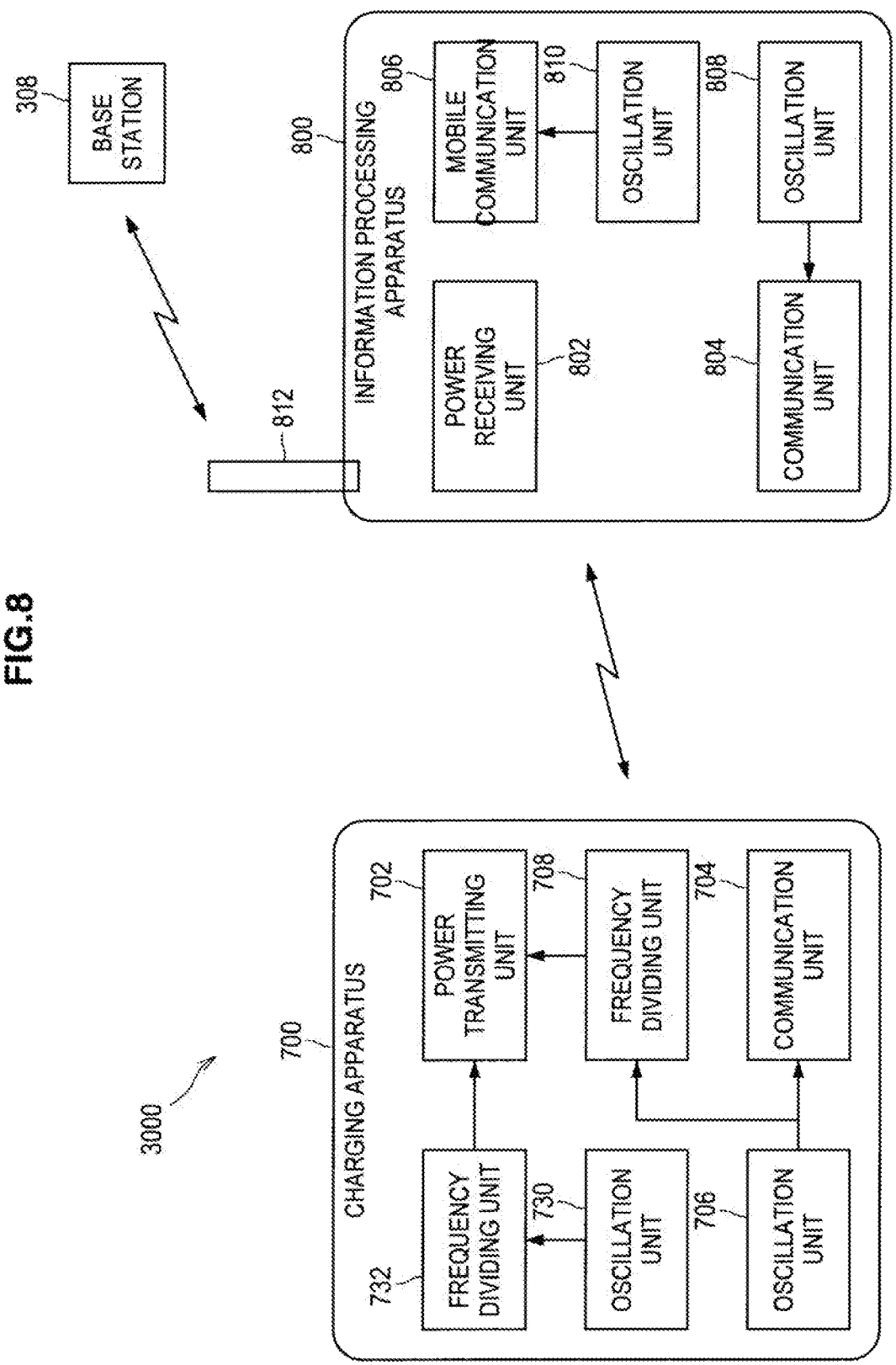
FIG. 8 is a diagram mainly showing the overall configuration of an information processing system according to a third embodiment of the present invention.

Next, an information processing system according to a third embodiment of the present invention will be described. FIG. 8 is a diagram mainly showing the overall configuration of an information processing system according to the present embodiment. The information processing system according to the present embodiment differs to the first embodiment described above in that the charging apparatus is equipped with a plurality of oscillation units and in that the frequency of the alternating current used when the charging apparatus transmits power is selected from a plurality of frequencies based on frequency information included in a power transmission request transmitted from the information processing apparatus.

In FIG. 8, an information processing system 3000 includes a charging apparatus 700 equipped with a reader/writer function and an information processing apparatus 800, such as a mobile telephone, equipped with a non-contact communication function. Note that the charging apparatus 700 is one example of a "first information processing apparatus" for the present invention and the information processing apparatus 800 is one example of a "second information processing apparatus" for the present invention.

The charging apparatus 700 includes a power transmitting unit 702, a communication unit 704, oscillation unit 706, 730, and frequency dividing units 708, 732. The power transmitting unit 702 transmits power to the information processing apparatus 800 using a coil L0 provided in the charging apparatus 700 and shown in FIG. 9, described later. The communication unit 704 communicates with the information processing apparatus 800 using the coil L0 shown in FIG. 9. The oscillation unit 706 generates alternating current with a frequency of 27.12 MHz, for example. The frequency dividing unit 708 divides the alternating current generated by the oscillation unit 706. The oscillation unit 730 generates alternating current with a different frequency to the frequency of the alternating current generated by the oscillation unit 706. The frequency dividing unit 732 divides the alternating current generated by the oscillation unit 730. Note that in the present embodiment, the charging apparatus 700 may further include other oscillation units and frequency dividing units.

The communication unit 704 uses alternating current with a frequency of 13.56 MHz produced by frequency division of the alternating current with the 27.12 MHz frequency generated by the oscillation unit 706 during communication as a carrier wave. Note that the 13.56 MHz frequency is one example of a "first frequency" for the present invention. The power transmitting unit 702 is capable of selecting the frequency of the alternating current used during power transmission. As one example, as the alternating current used during power transmission, the power transmitting unit 702 is capable of selecting alternating current with a frequency of 6.78 MHz, for example, produced by further frequency division by the frequency dividing unit 708 of the alternating current with the 13.56 MHz frequency produced by frequency division of the 27.12 MHz frequency generated by the oscillation unit 706 or alternating current produced by frequency division by the frequency dividing unit 732 of the alternating current generated by the oscillation unit 730. Note that the 6.78 MHz frequency is one example of a "second frequency" for the present invention.

The information processing apparatus 800 includes a power receiving unit 802, a communication unit 804, a mobile communication unit 806, oscillation units 808, 810, and an antenna 812. The power receiving unit 802 receives the power transmitted from the charging apparatus 700 using a coil L1 provided in the information processing apparatus 800 and shown in FIG. 9, described later. The communication unit 804 communicates with the charging apparatus 700 using the coil L1 shown in FIG. 9. The communication unit 804 transmits a power transmission request, which includes frequency information for designating the frequency of the alternating current to be used during power transmission, to the charging apparatus 700. The mobile communication unit 806 communicates with a base station 308 connected to a mobile telephone network (not shown) using the antenna 812. The oscillation unit 808 generates alternating current with the 27.12 MHz frequency, for example. The oscillation unit 810 generates alternating current with a frequency of 19.2 MHz, for example.

The communication unit 804 uses alternating current with a frequency of 13.56 MHz produced by frequency division of the alternating current with the 27.12 MHz frequency generated by the oscillation unit 808 during communication as a carrier wave. The mobile communication unit 806 uses the alternating current with the 19.2 MHz frequency generated by the oscillation unit 810 during communication as a carrier wave.

In the information processing system 3000, the charging apparatus 700 and the information processing apparatus 800 are capable of non-contact communication and non-contact charging.

Figure 9:
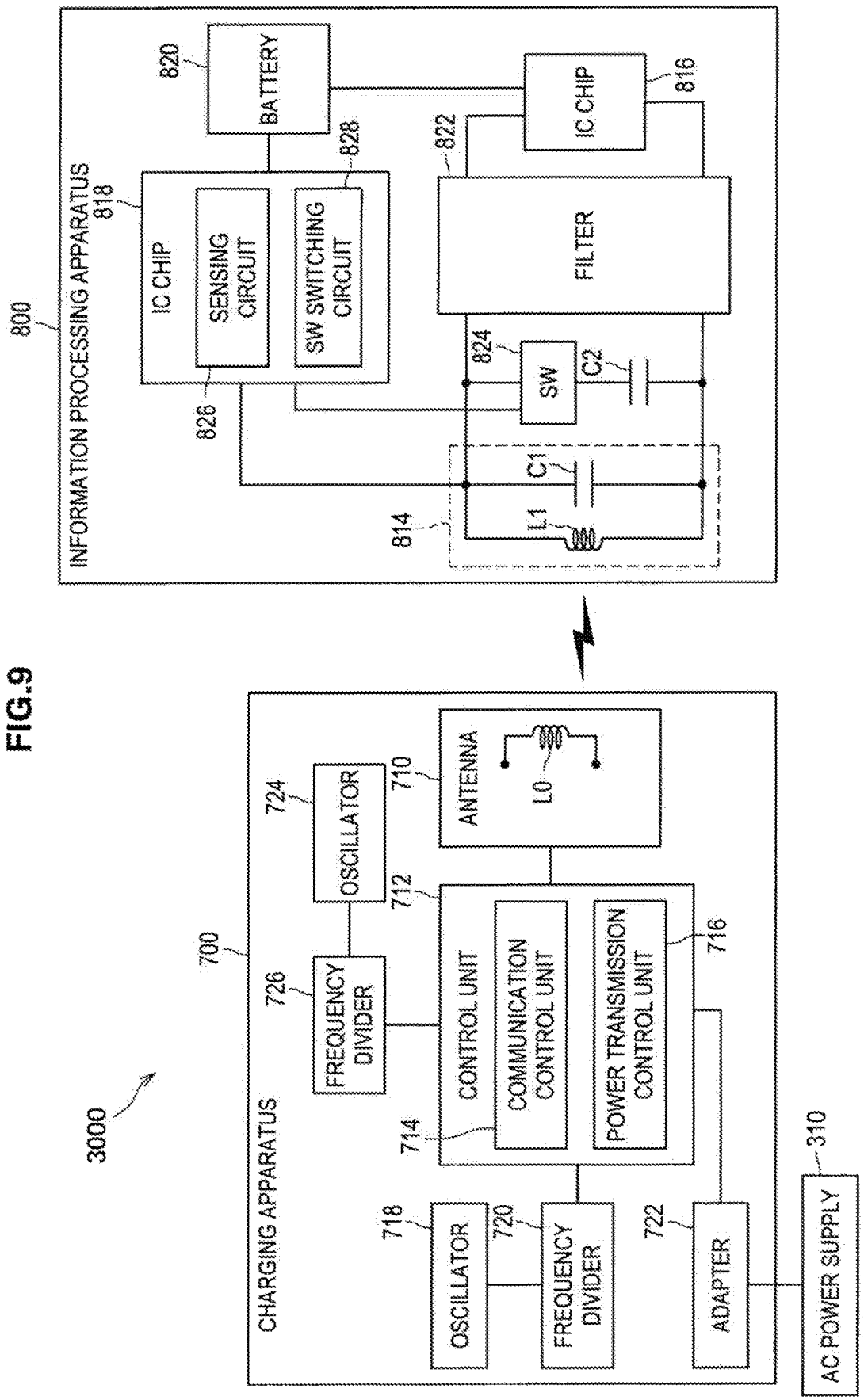
FIG. 9 is a diagram useful in showing the overall configuration of the information processing system shown in FIG. 8 in more detail.

Next, the configuration of the information processing system 3000 shown in FIG. 8 will be described in more detail. FIG. 9 is a diagram useful in showing the overall configuration of the information processing system 3000 shown in FIG. 8 in more detail.

In FIG. 9, the charging apparatus 700 includes an antenna 710, a control unit 712, oscillators 718, 724, frequency dividers 720, 726, and an adapter 722. The antenna 710 includes the coil L0. The control unit 712 controls the various components of the charging apparatus 700. The control unit 712 also includes a communication control unit 714 and a power transmission control unit 716. The oscillator 718 is an oscillator, such as a crystal oscillator, that generates alternating current with the 27.12 MHz frequency, for example. The frequency divider 720 divides the alternating current with the 27.12 MHz frequency generated by the oscillator 718 to generate alternating current with the 13.56 MHz frequency. The oscillator 724 is an oscillator, such as a crystal oscillator, that generates alternating current with a different frequency to the frequency of the alternating current generated by the oscillator 718. The frequency divider 726 divides the alternating current generated by the oscillator 724. Note that the frequency divider 726 may be a programmable frequency divider that is capable of dividing alternating current of various frequencies to produce various other frequencies. The adapter 722 is connected to an AC power supply 310 and supplies power to the various components of the charging apparatus 700. Note that in the present embodiment, the charging apparatus 700 may further include other oscillators and frequency dividers.

The information processing apparatus 800 includes a resonance circuit 814 in which the coil L1 and a capacitor C1 are connected in parallel, IC chips 816, 818, a battery 820, a filter 822, and a switch (SW) 824 for activate or deactivate a capacitor C2. In the resonance circuit 814, a frequency of 13.56 MHz is set as the resonant frequency. The IC chip 816 is an electrical circuit for non-contact communication. The IC chip 818 is an electrical circuit for charging the battery 820. The battery 820 stores the power transmitted from the charging apparatus 700. The battery 820 also supplies the stored power to various components of the information processing apparatus 800. The filter 822 is set with a specific cutoff frequency. For example, if alternating current with the 4.8 MHz frequency or alternating current with a different frequency to such frequency is selected and used when the charging apparatus 700 transmits power, a cutoff frequency for blocking alternating current of the selected frequency is set in the filter 822.

The IC chip 818 includes a sensing circuit 826 and a SW switching circuit 828. The sensing circuit 826 detects signals of a specific frequency. For example, if alternating current with the 4.8 MHz frequency is used when the charging apparatus 700 transmits power, the sensing circuit 826 detects signals with the 4.8 MHz frequency. The SW switching circuit 828 controls on/off switching of the SW 824. When the SW 824 is switched on, the capacitor C2 is connected and the resonant frequency of the resonance circuit 814 is set at a specific frequency. For example, if alternating current with the 4.8 MHz frequency is used when the charging apparatus 700 transmits power, the resonant frequency of the resonance circuit 814 is set at the 4.8 MHz frequency when the capacitor C2 is connected.

7. Charging/Communication Process

Figure 10:
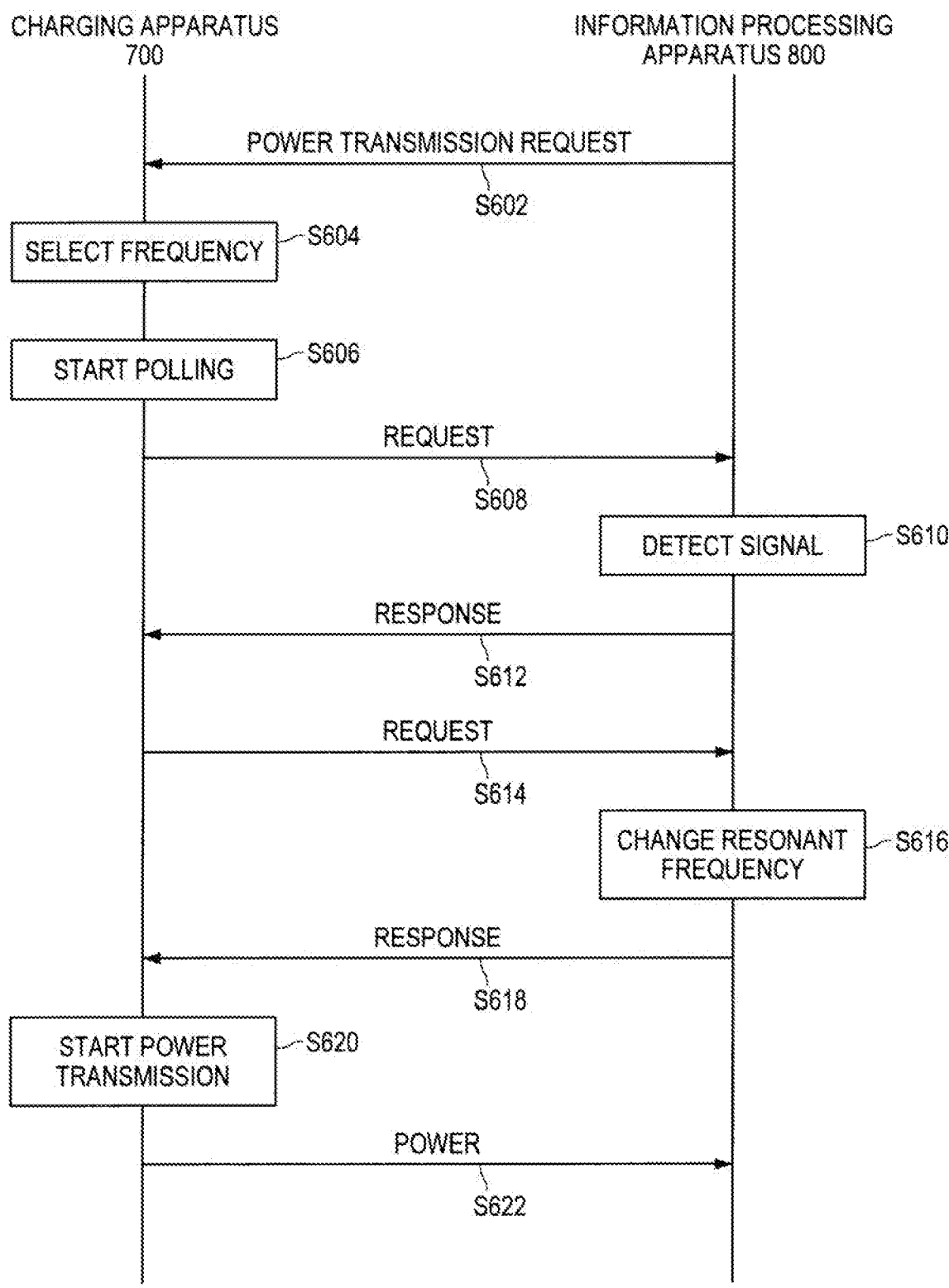
FIG. 10 is a sequence diagram of a charging/communication process carried out by the information processing system shown in FIG. 8.

Next, a charging/communication process carried out by the information processing system 3000 shown in FIG. 8 will be described. FIG. 10 is a sequence diagram of the charging/communication process carried out by the information processing system 3000 shown in FIG. 8.

In FIG. 10, first, the IC chip 818 of the information processing apparatus 800 transmits a power transmission request, which includes frequency information for designating the frequency of the alternating current to be used during charging, to the charging apparatus 700 (step S602).

Next, based on the frequency information included in the power transmission request received in step S602, the power transmission control unit 716 of the charging apparatus 700 selects the frequency of the alternating current to be used during charging (step S604). For example, when the frequency information is frequency information corresponding to the frequency of the alternating current generated by the oscillator 718, the power transmission control unit 716 selects the alternating current generated by the oscillator 718 as the alternating current to be used during charging. Alternatively, when the frequency information is frequency information corresponding to the frequency of the alternating current generated by the oscillator 724, the power transmission control unit 716 selects the alternating current generated by the oscillator 724 as the alternating current to be used during charging.

Next, the power transmission control unit 716 of the charging apparatus 700 starts polling, that is, the power transmission control unit 716 starts searching for the information processing apparatus 800 by transmitting a request signal for a start of power transmission with the frequency selected in step S604 to the external at specific intervals (step S606). The frequency selected in step S604 is one example of a "fourth frequency" for the present invention. The power transmission control unit 716 of the charging apparatus 700 thereafter transmits a request signal with the frequency selected in step S604 to the information processing apparatus 800 (step S608).

After this, the sensing circuit 826 of the information processing apparatus 800 detects the request signal for a start of power transmission with the frequency selected in step S604 that was transmitted in step S608 (step S610).

Next, the IC chip 818 of the information processing apparatus 800 transmits a response signal for permitting the start of power transmission to the charging apparatus 700 as a reply to the request signal transmitted in step S402 (step S612).

After this, the power transmission control unit 716 of the charging apparatus 700 transmits a request signal with the frequency selected in step S604 for changing the resonant frequency of the resonance circuit 814 of the information processing apparatus 800 to the information processing apparatus 800 (step S614).

Next, based on the request signal transmitted in step S614, the SW switching circuit 828 of the information processing apparatus 800 switches the SW 824 on to change the resonant frequency of the resonance circuit 814 from the 13.56 MHz frequency to the frequency selected in step S604 (step S616).

After this, the IC chip 818 of the information processing apparatus 800 transmits a response signal to the charging apparatus 700 as a reply to the request signal transmitted in step S614 (step S618).

Next, the power transmission control unit 716 of the charging apparatus 700 starts transmitting power to the information processing apparatus 800 using alternating current of the frequency selected in step S604 (step S620). The power transmission control unit 716 of the charging apparatus 700 thereafter transmits power to the information processing apparatus 800 (step S622), and the present process ends.

According to the charging/communication process shown in FIG. 10, the power transmission control unit 716 of the charging apparatus 700 selects the frequency of the alternating current used during charging based on the frequency information included in the power transmission request received from the information processing apparatus 800. The power transmission control unit 716 transmits a request signal for a start of power transmission, a request signal for changing the resonant frequency, and also power to the information processing apparatus 800 using the selected frequency. Here, since the information processing apparatus 800 is equipped with the filter 822 whose cutoff frequency is set in order to block alternating current of a frequency that is selectable by the power transmission control unit 716 of the charging apparatus 700, alternating current of the selected frequency is blocked by the filter 822. By doing so, since it is possible to suppress the load applied to the IC chip 816, or in other words, the electrical circuit used for non-contact communication during non-contact charging, it is possible to prevent the electrical circuit used for non-contact communication from being destroyed, even when the non-contact charging continues for a long time. This means that non-contact charging can be carried out safely.

8. Information Processing System (Fourth Embodiment)

Figure 11:
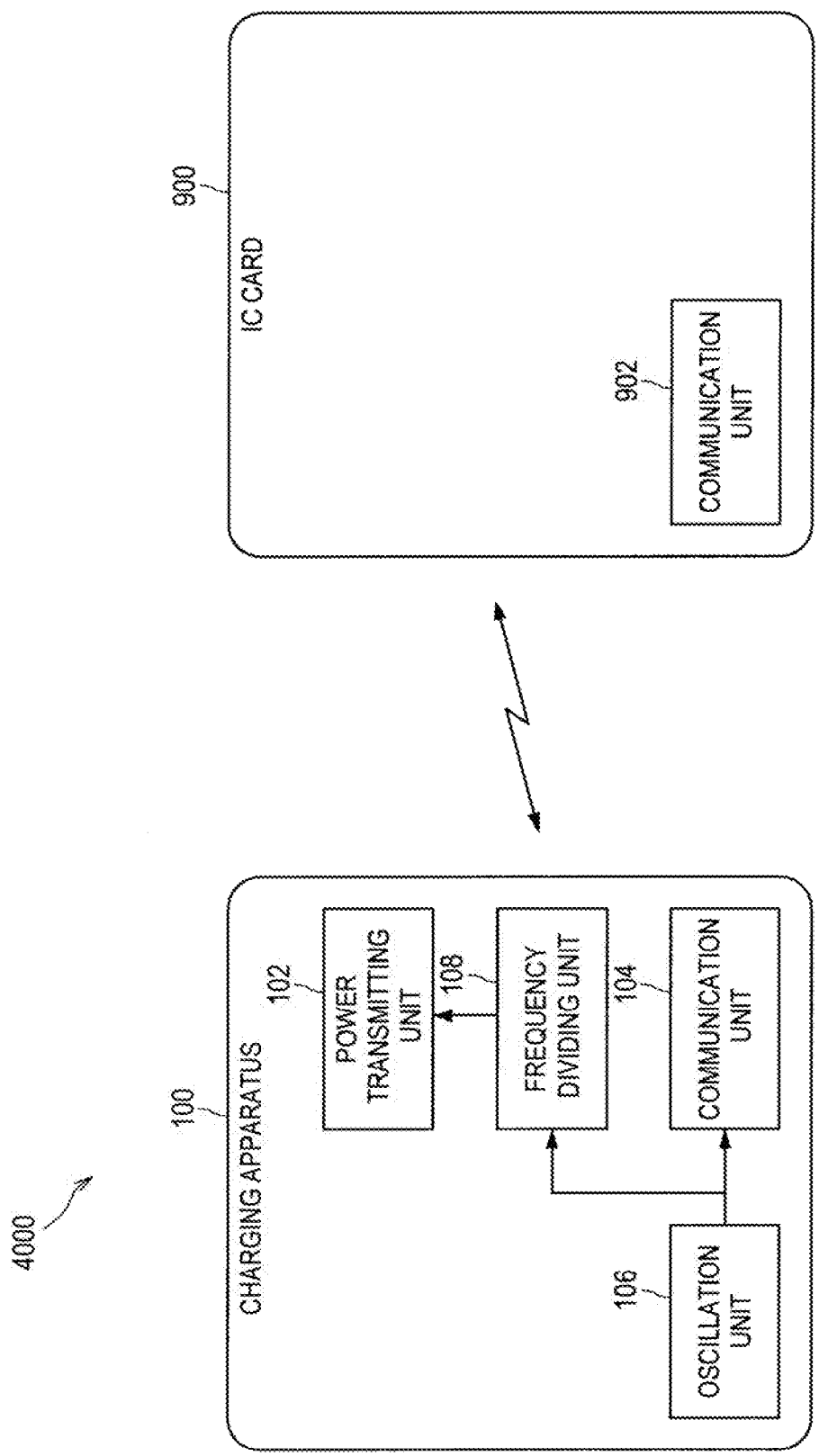
FIG. 11 is a diagram mainly showing the overall configuration of an information processing system according to a fourth embodiment of the present invention.

Next, an information processing system according to a fourth embodiment of the present invention will be described. FIG. 11 is a diagram mainly showing the overall configuration of an information processing system according to the present embodiment. The information processing system according to the present embodiment differs to the first embodiment described above by including an IC card as an information processing apparatus equipped with a non-contact communication function in place of the information processing apparatus 200.

In FIG. 11, an information processing system 4000 includes the charging apparatus 100 mainly equipped with a reader/writer function and an IC card 900 as an information processing apparatus equipped with a non-contact communication function.

The charging apparatus 100 includes the power transmitting unit 102, the communication unit 104, the oscillation unit 106, and the frequency dividing unit 108. The power transmitting unit 102 transmits power to the external using a coil L0 provided in the charging apparatus 100 and shown in FIG. 12, described later. The communication unit 104 communicates with the IC card 900 using the coil L0 shown in FIG. 12. The oscillation unit 106 generates alternating current with a frequency of 27.12 MHz, for example. The frequency dividing unit 108 divides the alternating current generated by the oscillation unit 106.

The communication unit 104 uses alternating current with a frequency of 13.56 MHz produced by frequency division of the alternating current with the 27.12 MHz frequency generated by the oscillation unit 106 during communication as a carrier wave. During power transmission, the power transmitting unit 102 uses alternating current of a frequency of 6.78 MHz, for example, produced by the frequency dividing unit 108 further dividing alternating current of the 13.56 MHz frequency produced by dividing the alternating current of the 27.12 MHz frequency generated by the oscillation unit 106.

The IC card 900 includes a communication unit 902. The communication unit 902 communicates with the charging apparatus 100 using a coil L1 shown in FIG. 12.

In the information processing system 4000, the charging apparatus 100 and the IC card 900 are capable of non-contact communication.

Figure 12:
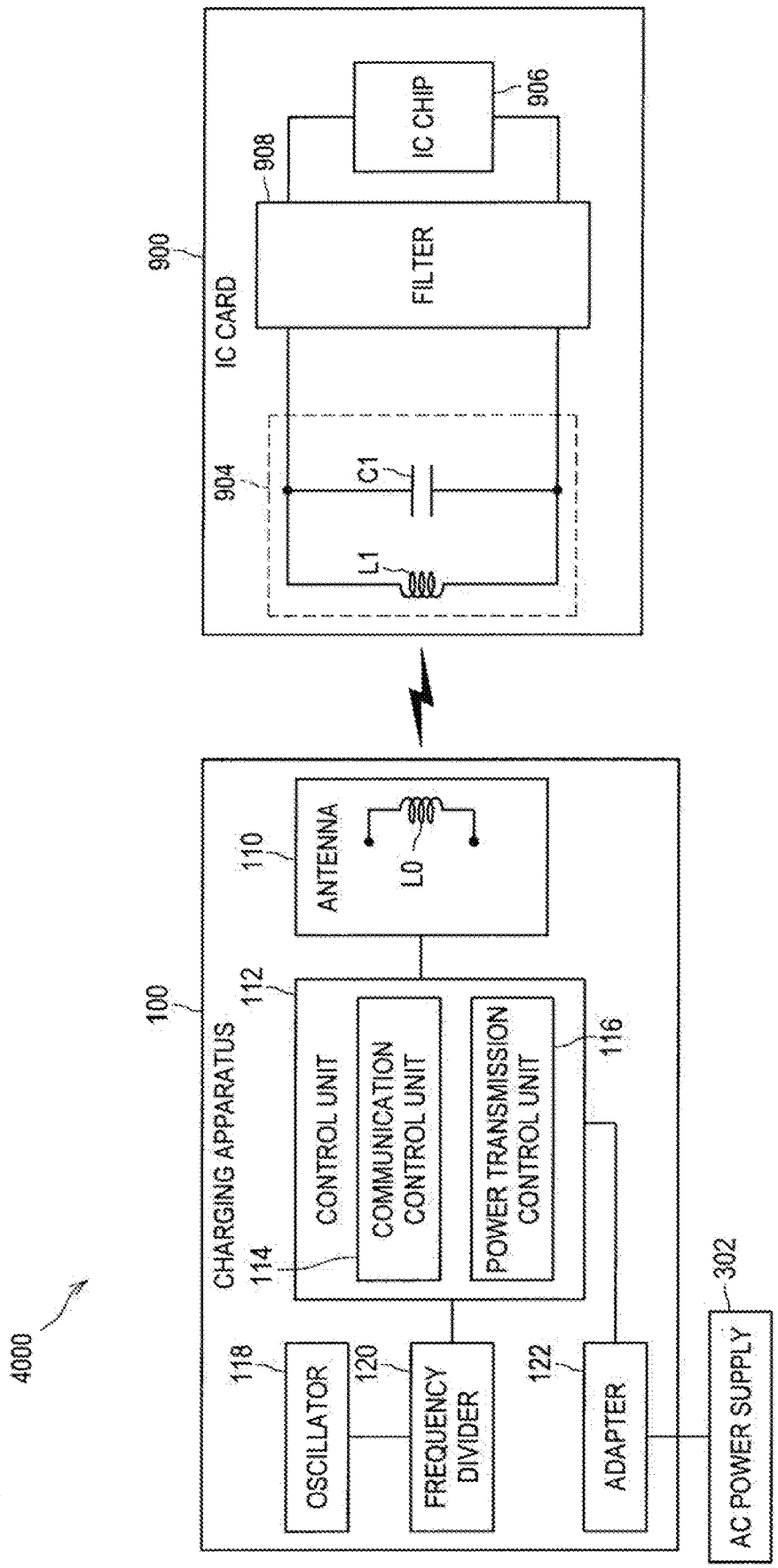
FIG. 12 is a diagram useful in showing the overall configuration of the information processing system shown in FIG. 11 in more detail.

Next, the configuration of the information processing system 4000 shown in FIG. 11 will be described in more detail. FIG. 12 is a diagram useful in showing the overall configuration of the information processing system 4000 shown in FIG. 11 in more detail.

In FIG. 12, the charging apparatus 100 includes the antenna 110, the control unit 112, the oscillator 118, the frequency divider 120, and the adapter 122. The antenna 110 includes the coil L0. The control unit 112 controls the various components of the charging apparatus 100. The control unit 112 also includes the communication control unit 114 and the power transmission control unit 116. The oscillator 118 is an oscillator, such as a crystal oscillator, that generates alternating current with the 27.12 MHz frequency, for example. The frequency divider 120 divides the alternating current with the 27.12 MHz frequency generated by the oscillator 118 to generate alternating current with the 13.56 MHz frequency and alternating current with the 6.78 MHz frequency. The adapter 122 is connected to an AC power supply 302 and supplies power to the various components of the charging apparatus 100.

The IC card 900 includes a resonance circuit 904 in which the coil C1 and a capacitor C1 are connected in parallel, an IC chip 906, and a filter 908. In the resonance circuit 904, the 13.56 MHz frequency is set as the resonant frequency. The IC chip 906 is an electrical circuit for non-contact communication. The filter 908 is set with a specific cutoff frequency. For example, if alternating current with the 6.78 MHz frequency is used when the charging apparatus 100 transmits power, a cutoff frequency of 6.78 MHz is set in the filter 908.

According to the present embodiment, the power transmission control unit 116 of the charging apparatus 100 transmits a request signal for a start of power transmission, a request signal for changing the resonant frequency, and also power to the external using the 6.78 MHz frequency. Here, since the IC card 900 that may not necessarily be charged is equipped with the filter 908 whose cutoff frequency is set at 6.78 MHz, alternating current with the 6.78 MHz frequency is blocked by the filter 908. By doing so, even when a signal with the 6.78 MHz frequency is transmitted to the IC card 900 that may not necessarily be charged, it is possible to suppress the load applied to the IC chip 906, or in other words, the electrical circuit for non-contact communication. This means that it is possible to prevent destruction of the electrical circuit for non-contact communication.

9. Results of Numerical Simulation

Figure 13:
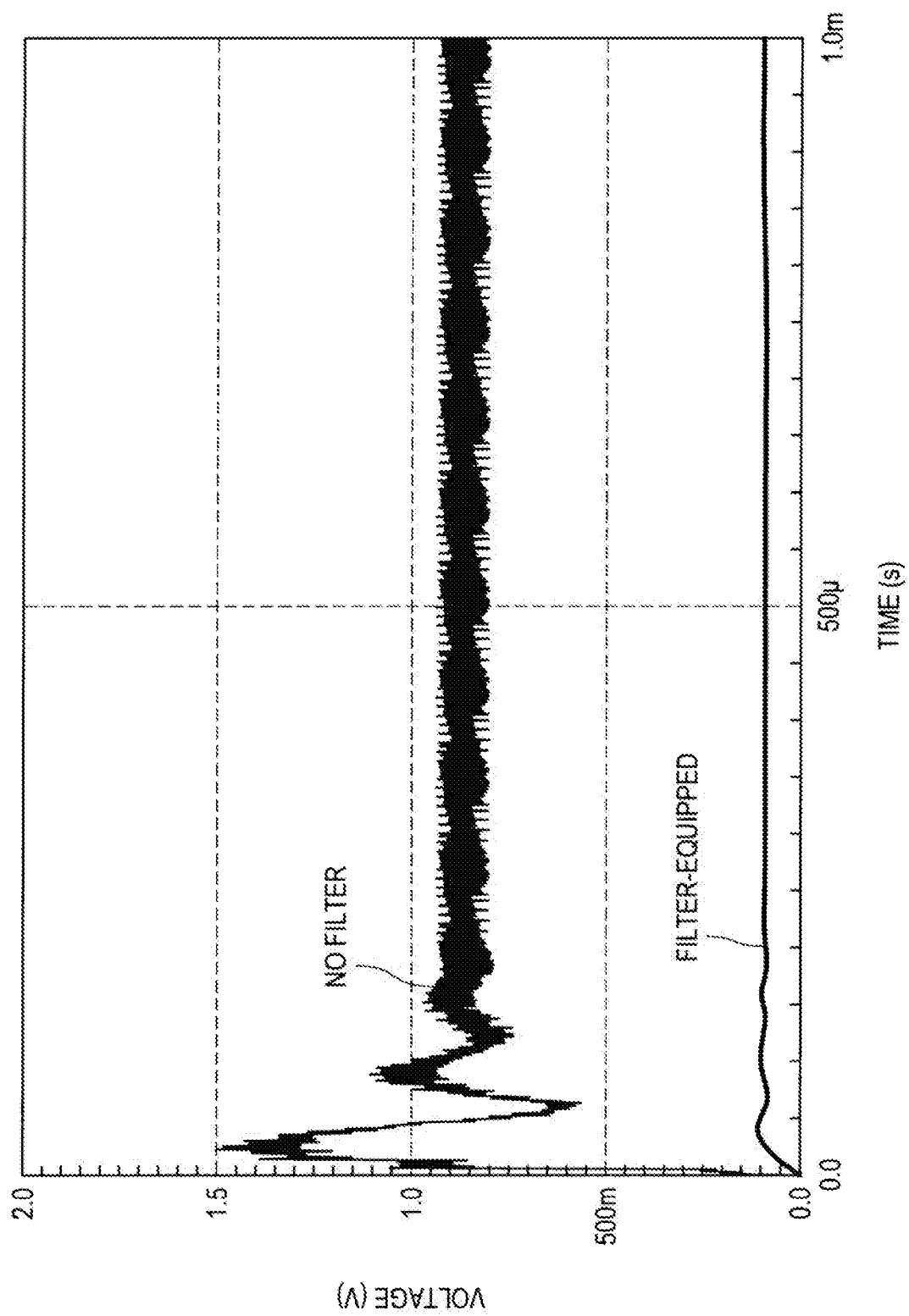
FIG. 13 is a graph showing the results of numerical simulation of voltage for the information processing system according to the first embodiment mentioned above for the case where an information processing apparatus is equipped with a filter and the case where the information processing apparatus is not equipped with a filter.
Figure 14:
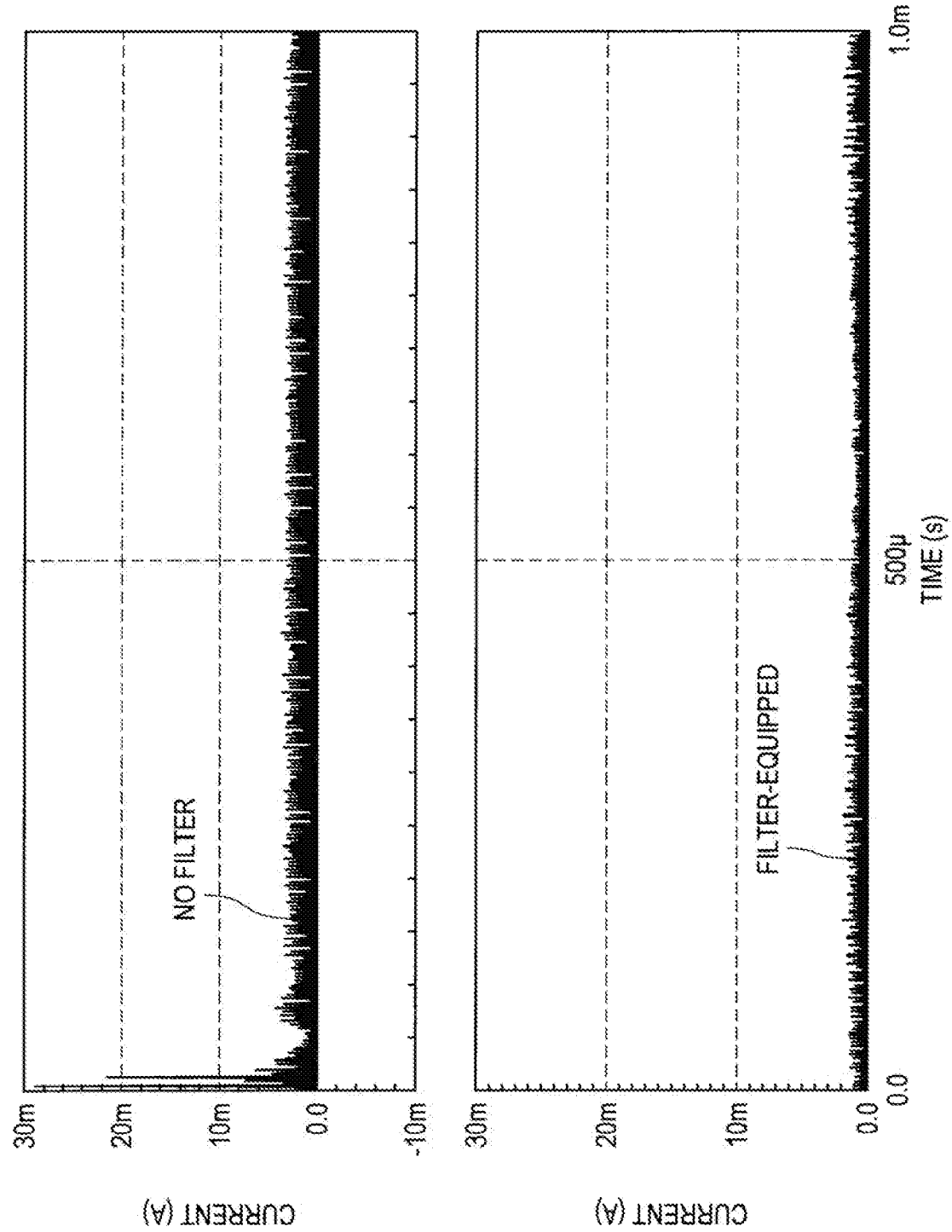
FIG. 14 is two graphs showing the results of numerical simulation of current for the information processing system according to the first embodiment mentioned above, one for the case where the information processing apparatus is equipped with a filter, and the other for the case where the information processing apparatus is not equipped with a filter.

Next, the results of numerical simulation for the information processing system 1000 according to the first embodiment described above will be described for the case where the information processing apparatus 200 is equipped with the filter 222 and the case where the information processing apparatus 200 is not equipped with the filter 222. FIG. 13 is a graph showing the results of numerical simulation of voltage for the information processing system 1000 according to the first embodiment described above for the case where the information processing apparatus 200 is equipped with the filter 222 and the case where the information processing apparatus 200 is not equipped with the filter 222. FIG. 14 is two graphs showing the results of numerical simulation of current for the information processing system 1000 according to the first embodiment described above for the case where the information processing apparatus 200 is equipped with the filter 222 and the case where the information processing apparatus 200 is not equipped with the filter 222. Note that in this numerical simulation, values of the voltage and the current after rectification in the IC chip 216 during the transmission of power by the charging apparatus 100 were calculated.

As shown in FIG. 13, when the information processing apparatus 200 was not equipped with the filter 222 (labeled as "no filter" in FIG. 13), a voltage of 1.5V was calculated as the inrush voltage and a voltage of around 0.86V was calculated as the voltage thereafter. Conversely, when the information processing apparatus 200 was equipped with the filter 222 (labeled as "filter-equipped" in FIG. 13), a voltage of around 0.09V was calculated with no significant inrush voltage being found in the simulation.

As shown in FIG. 14, when the information processing apparatus 200 was not equipped with the filter 222 (labeled as "no filter" in FIG. 14), a current of 25 mA was calculated as the inrush current and a current of around 2.8 mA was calculated as the current thereafter. Conversely, when the information processing apparatus 200 was equipped with the filter 222 (labeled as "filter-equipped" in FIG. 14), a current of around 1 mA was calculated with no significant inrush current being found in the simulation.

From the results of the numerical simulation shown in FIGS. 13 and 14, it was understood that compared to when the information processing apparatus 200 is not equipped with the filter 222, it is possible to reduce the values of the voltage and current in the IC chip 216 when the filter 222 is provided, which means that it is possible to reliably suppress the load applied to the IC chip 216, or in other words, the electrical circuit used for non-contact communication.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus, comprising:
a resonance circuit configured to:
communicate with an external apparatus by a first carrier wave of a first frequency;
receive, via the communication of the first frequency, frequency information from the external apparatus; and
wirelessly receive power from the external apparatus based on the received frequency information, and
a setting unit configured to change a resonance frequency of the resonance circuit from the first frequency to a second frequency for the wireless reception of the power, wherein
the resonance frequency is changed to the second frequency based on frequency information communicated from the external apparatus by the first carrier wave of the first frequency, and
the frequency information indicates the second frequency.

2. The information processing apparatus of claim 1, wherein the setting unit is further configured to change the resonance frequency to the second frequency based on a request for wireless charging operation communicated from the external apparatus.

3. The information processing apparatus of claim 2, wherein the request comprises the frequency information.

4. The information processing apparatus of claim 1, wherein the first frequency is different from the second frequency.

5. The information processing apparatus of claim 1, wherein the first frequency is approximately 13.56 MHz.

6. The information processing apparatus of claim 1, further comprising a filter configured to suppress application of a second carrier wave having the second frequency to the resonance circuit.

7. A method, comprising:
communicating, by a resonance circuit, with an external apparatus by a carrier wave of a first frequency;
receiving, by the resonance circuit and via the communication of the first frequency, frequency information from the external apparatus;

wirelessly receiving, by the resonance circuit, power from the external apparatus based on the received frequency information; and changing, by a setting unit, a resonance frequency of the resonance circuit from the first frequency to a second frequency for the wireless reception of the power, wherein the resonance frequency is changed to the second frequency based on frequency information communicated from the external apparatus by the carrier wave of the first frequency, and the frequency information indicates the second frequency.

8. A non-transitory computer-readable medium having stored thereon computer-executable instructions that, when executed by an information processing apparatus, cause the information processing apparatus to execute operations, the operations comprising:

communicating, by a resonance circuit of the information processing apparatus, with an external apparatus by a carrier wave of a first frequency;

receiving, by the resonance circuit and via the communication of the first frequency, frequency information from the external apparatus;

wirelessly receiving, by the resonance circuit, power from the external apparatus based on the received frequency information; and changing, by a setting unit of the information processing apparatus, a resonance frequency of the resonance circuit from the first frequency to a second frequency for the wireless reception of the power, wherein the resonance frequency is changed to the second frequency based on frequency information communicated from the external apparatus by the carrier wave of the first frequency, and the frequency information indicates the second frequency.

* * * * *